United States Patent [19]

Hanni et al.

[11] Patent Number: 4,566,009

[45] Date of Patent: Jan. 21, 1986

[54] IDENTIFICATION, FRIEND OR FOE IFF INSTALLATION

[75] Inventors: Manfred Hanni, Puchheim; Kurt Hechfellner, Taufkirchen, both of Fed. Rep. of Germany

[73] Assignee: Siemens Aktiengesellschaft, Berlin & Munich, Fed. Rep. of Germany

[21] Appl. No.: 207,996

[22] Filed: Oct. 14, 1980

[30] Foreign Application Priority Data

Oct. 16, 1979 [DE] Fed. Rep. of Germany ....... 2941820

[51] Int. Cl.$^4$ ......................... G01S 9/56; G01S 13/74
[52] U.S. Cl. ........................ 343/6.5 LC; 343/6.8 LC
[58] Field of Search .............. 343/6.5 LC (U.S. only), 343/6.8 LC (U.S. only), 6.5 SS

[56] References Cited

U.S. PATENT DOCUMENTS

| | | | |
|---|---|---|---|
| 3,167,772 | 1/1965 | Bagnall, Jr. et al. | 343/6.5 LC X |
| 3,341,845 | 9/1967 | Deman | 343/6.8 LC X |
| 3,341,846 | 9/1967 | McMurren et al. | 343/6.8 LC |
| 3,579,235 | 5/1971 | Straub et al. | 343/6.5 LC |
| 3,750,163 | 7/1973 | Hecker | 343/18 E X |
| 3,945,006 | 3/1976 | Cleeton | 343/6.5 R X |
| 3,949,397 | 4/1976 | Wagner et al. | 343/18 E X |

Primary Examiner—Theodore M. Blum
Attorney, Agent, or Firm—Hill, Van Santen, Steadman & Simpson

[57] ABSTRACT

In an installation for identification friend or foe, coded interrogations and replies of an interrogation installation of the interrogating station and of a transponder of the interrogated station are transmitted in utilizing a radiotelephony installation. The transmission of the reply (identification) proceeds according to the frequency jumping procedure via the radiotelephony installation. The interrogation of the interrogating station consists of a known encoded code word and an encoded variable data part which contains (or comprises) a frequency address. The making available (or offering) of the transmit frequencies of the transponder proceeds by means of a frequency synthesizer controlled (or operated) by the frequency address. The reply is, in certain circumstances, repeated on several, successively transmitted frequencies.

16 Claims, 3 Drawing Figures

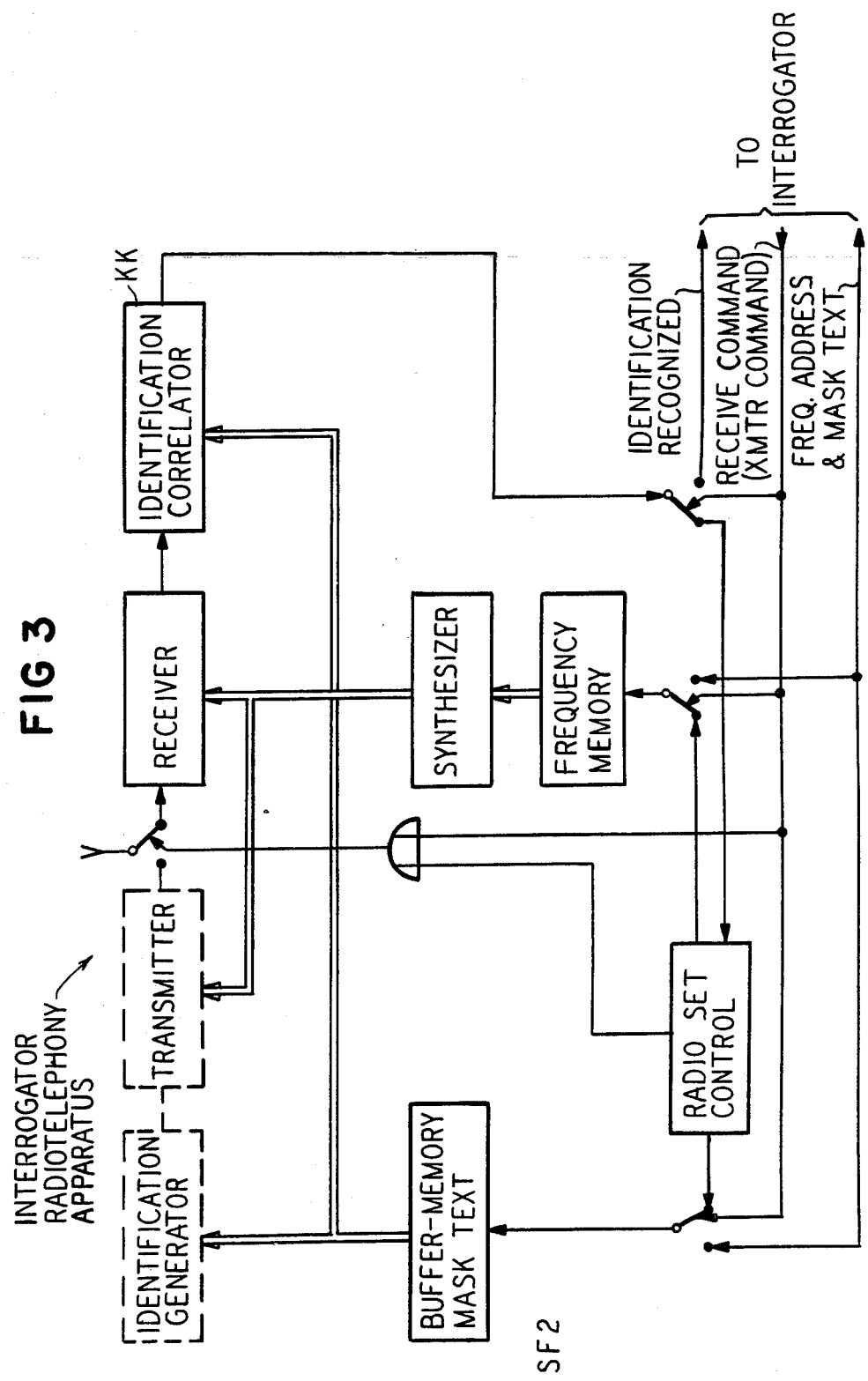

IDENTIFICATION, FRIEND OR FOE IFF INSTALLATION

The invention relates to an installation for identification friend or foe utilizing coded interrogations and replies in conjunction with an interrogation installation of the interrogating stations and a transponder of the interrogated stations, and with a radiotelephony installation for the encoded (1) communication (or message transmission) between the interrogating and the interrogated station.

In order to obtain usable information from interrogated stations in IFF-systems, in certain instances a large number of measures is necessary in order to protect the interrogation and the response by a transponder, above all, from targeted (or aimed) interference (or jamming) maneuvers of an enemy and to make them illegible (or unintelligible) for unauthorized [personnel]. One of these measures can e.g. consist in encoding the interrogation in order, in this fashion, to make it impossible for enemy interrogations to trigger any IFF-reply. On the other hand, the encoding of the IFF-reply is very important in order that an enemy weapons system cannot transmit any positive friend-identification. It is equally important that the friend-identification can be received in an interference (or jamming) free fashion. Since the IFF-reply up to the present time is being transmitted in a relatively broad-band fashion on a reserved frequency, an interference (or jamming) of the reply transmission, and hence a reduction in the effect of rapidly reacting detection systems is possible with low enemy outlay.

The object underlying the invention consists, in the case of an installation for identification friend or foe of the type initially cited, in improving the interference (or jamming) resistance (or protection) with a relatively low outlay.

In accordance with the invention, this object is achieved in that, for the purpose of interference (or jamming)-resistant IFF-transmission, pursuant to co-utilization of the installations, or parts of the installations, of an interference (or jamming)-resistant-designed radiotelephony installation, the transmission of the reply (identification) of the interrogated station proceeds in accordance with the frequency jumping procedure via the radiotelephony installation in such a fashion that the interrogating station transmits, as the interrogation, a fixed encoded code word, known at the interrogation location, an encoded variable data section containing a frequency address which simultaneously adjusts the reply receiver of the radio installation of the interrogating station to the transmit frequency of the expected reply of the interrogated station, and that the making available (or offering) of the transmit frequencies of the interrogated station proceeds by means of a frequency synthesizer controlled by the frequency address, and that, following a first reply of minimal redundancy, if necessary, a numbered second reply having great redundancy is successively transmitted on several different frequencies.

The advantage of the inventive installation lies in that the interrogation is very interference (or jamming)-resistant and that a minimal additional outlay becomes necessary for generating (or producing) the frequency addresses and the code texts for the purpose of encoding the identification, since the reply address is implicitly communicated.

Since virtually all weapons systems henceforth will carry interference (or jamming)-resistant radiotelephony installations, it is advantageous to jointly utilize these installations, or parts thereof, for an interference (or jamming)-resistant identification transmission. The IFF-response here has absolute preeminence. The interference (or jamming) effect on a currently existing radiotelephony connection (or communication) can be intercepted by the redundant speech transmission, assuming that the IFF-reply is brief (approximately 10 ms) and that it is to be relatively seldom broken off (or interrupted) (two interrogations per second).

In order to increase the interference (or jamming) resistance of the radiotelephony, or to first reach it at all, respectively, the frequency jumping, which is particularly suitable for ground-to-ground-communication, is employed. This signifies that, in every radiotelephony apparatus, a series of frequencies ([or] better, binary adjustment values for the synthesizer) are stored. Moreover, for the radiotelephony-connection setup signalling, methods of correlation reception are employed. The call signals consist of a clear time signal (or character), selected according to good correlation properties, and an encoded call word marking the receiver.

For the IFF-reply, these radiotelephony-typical call signals; in particular, the corresponding signal transmitters and signal receivers, can be jointly employed. A suitable IFF-specific masking of the call word ensures the separability of IFF- and radiotelephony-signals.

In order to emit (or transmit) an IFF-reply, the following signals must be transmitted (or emitted) to the radiotelephony apparatus:

frequency address or adjustment information for the frequency synthesizer a masked (or veiled) text for the purpose of IFF-individual masking of the radiotelephony call word transmit command The processing (or editing) of the signals takes place either in an adaptation (or matching) apparatus between the IFF-transponder and the radiotelephony apparatus, or it is a fixed constituent (or component) part of the transponder.

In addition, it is advantageous to design the IFF-response adaptively; i.e., a first interrogation is to trigger only a brief reply. The interference (or jamming) effect of this reply on the radiotelephony is then only minimal. Only in 10% of all interrogations is a so-called second interrogation to become necessary and trigger a frequent IFF-reply to be transmitted on many frequencies, so that the overall recognition protection of an IFF-reply becomes very great.

The encoding and decoding of an IFF-interrogation signal assumes synchronism of the corresponding coding apparatus (or cipher machines). This synchronism can be forced (or constrained) by more or less precise time normals (clocks). A simple method of correctly decoding, in spite of synchronization errors, consists in that, by means of a start-stop-operation of the coder, a new code text is generated and stored per time increment (milliseconds to seconds). For decoding three code texts are simultaneously employed.

1. Code text from a preceding time increment
2. Code text from the currently valid time increment
3. Code text from the next-following time increment.

It is readily apparent that the allowed synchronization error can be permitted to be ±1 time increment. One of the three code texts can then decode the message. However, the beginning, or end, respectively, must be recognizable in the received message; moreover, an encoded code word, known at the transmitting- and receiving location (or station), and contained in the message, must determine the respective code text.

Depending upon the quality of the clocks employed, various methods of IFF-interrogation and -response are possible. The clock precision is of importance insofar as very brief time increments can be made with precise, but expensive clocks (error $10^{-8}$); i.e., very frequently new code texts become effective (or operative). Imprecise clocks lead to long time increments, thus also [to] long validity periods (or durations) of a code text. This connection shall be explained in the following on the basis of two examples.

1. Clock precision $\pm 10^{-6}$. The "clock" is corrected every 8 days. Eight days identical $= 691\ 200$ s. $691\ 200 \cdot 2 \cdot 10^{-6} = 1.38$ s. The clock error after 8 days can amount to $\pm 1.38$ s. A time increment follows therefrom of approximately 1.5 s; i.e., every 1.5 s a new code text is employed and all interrogations within 1.5 s have the same encoding.
2. Clock precision $\pm 10^{-8}$. The "clock" is corrected every 8 days. $691\ 200 \cdot 2 \cdot 10^{-8} = 13.8$ ms.

Thus, a new code text is possible every 15 ms. Virtually every interrogation has a different code text as a basis.

As previously mentioned, in the case of imprecise clocks, several interrogations can fall into the validity (or current, or significant) period of a code text and thus bring about identical interrogation signals, or reply signals, respectively. This could be exploited by the enemy for interference (or jamming) purposes or utilized for a friend-simulation respectively. For this reason it is expedient to incorporate, in every interrogation, a variable data part, generated per interrogation, respectively. This variable data part, together with the code text, which is valid for a longer [period of] time, can serve as basis-information for generating frequency addresses and for masking reply-identifications.

The interrogation in this instance contains (or comprises) not only a fixed or encoded code word, but additionally a data part varying per interrogation. Whereas, in the fixed code word, errors are permitted, in the variable data part of the interrogation, transmission errors must at least be recognized through data protection measures. Methods of redundant coding can find application here.

The variable data part of the interrogation, together with the currently valid code text (parts thereof), can, in a simple fashion, serve as start information of a linear, fed-back shift register (scrambler). After the recognition of an interrogation, the decoding of the interrogation signal, and the setting of this register, by means of defined clock-pulsing of this register the frequency address and masked text for the masking of the reply identification can be obtained and retransmitted to the radio apparatus for the purpose of response. In this manner also the so-called second reply; namely, many identifications on different frequencies, can be generated. In this instance, the register is repeatedly (or multiply) charged (or fed, or loaded) with clock pulses in a compulsory (or forced) sequence, and thus different frequency addresses and different masked texts are produced (or generated) per operating (or work) step. Of course, a similar procedure must be carried out on the interrogation side for the purpose of decoding the reply. Delay times, brought about by the processing time of the interrogation signal at the transponder, must be taken into account on the reply receiving side. Likewise, the maximally occurring distance (or link path) transit (or propagation) time (2) can be taken into account by means of a "receiving window" for the respective identification. The degree of safety (or protection) of this method, in relation to enemy interference (or jamming) capability, or simulation capability, respectively, is, indeed, restricted, but is nevertheless sufficiently high. This method can, of course, also be applied in the [case of] utilization of precise clocks. The degree of safety (or protection) increases as the validity (or current, or significant) period of the code text becomes shorter.

In the utilization of precise clocks, or in the case of a brief validity period of the code text (several milliseconds), it is possible to dispense with the transmission of a variable data part in the interrogation, since every interrogation, with [a] high [degree of] probability, is encoded with another code text. The evaluation (or analysis) of the interrogation is then only still restricted to the decoding of the fixed encoded code word for the purpose of synchronization of the transponder coder to the interrogation coder and decoding: 1./2. Interrogation, frequency address and masked text for masking the identification can be taken (or removed) from the coder at the transponder; i.e., in addition to the generation of the code text for the purpose of decoding the interrogation (3) texts, respectively), additional code-bits for frequency addresses and identification encoding are generated and, with the recognition of an interrogation, are retransmitted to the radio apparatus. In a second interrogation, the coder is clock-pulsed in a compulsory (or forced) sequence (or train) and the resulting code texts are retransmitted to the radio apparatus. This occurs at the interrogator as well as at the transponder (taking into account the signal processing time).

The invention and further embodiments of the invention shall be explained in greater detail on the basis of FIGS. 1 through 3:

FIGS. 2, 3 illustrate block circuit diagrams of an interrogating station and an associated radio telephone [apparatus].

Figure 1:
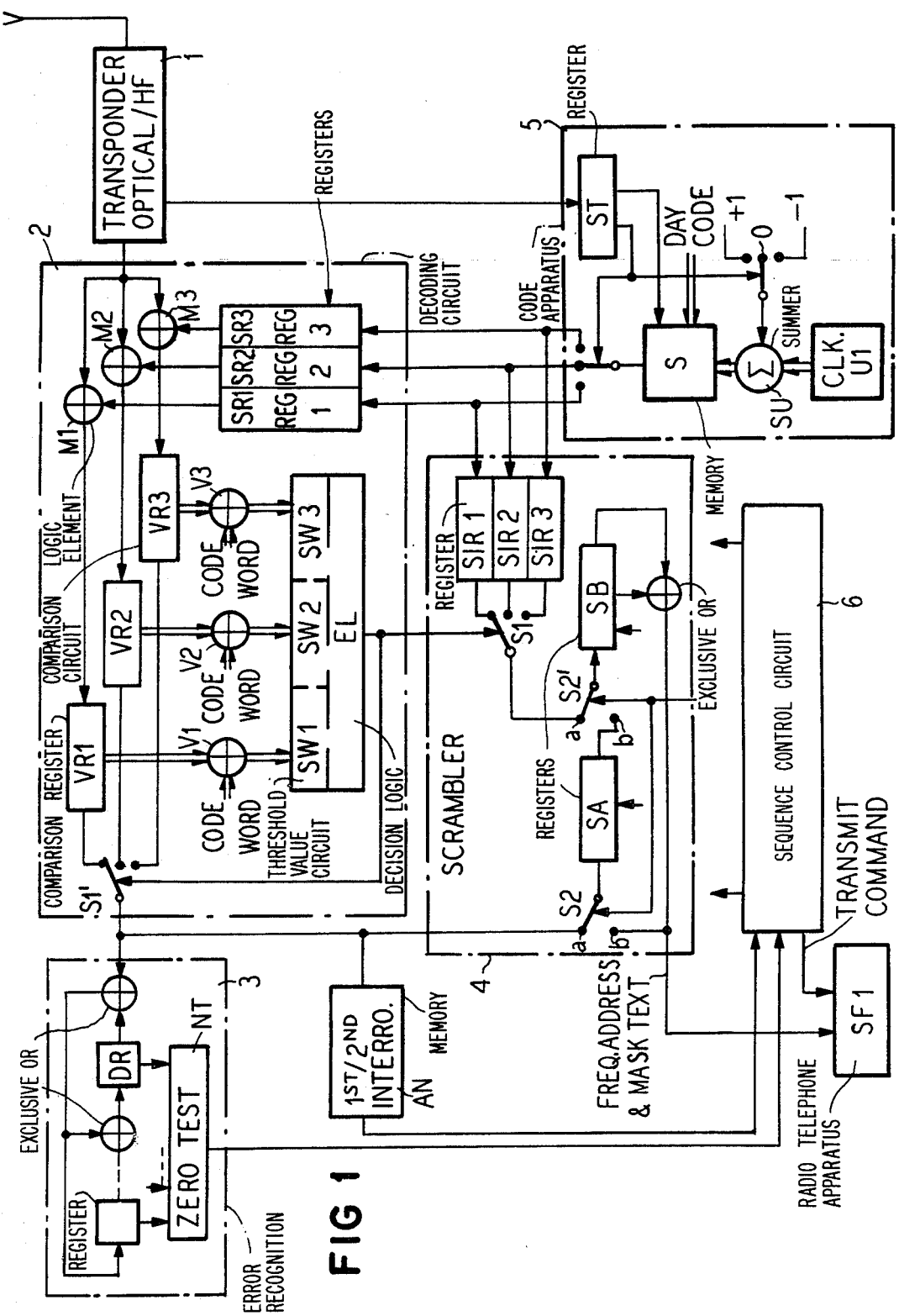
FIG. 1 illustrates block circuit diagrams of a reply transmitter (transponder) and of the respective installations with connections for an associated radio telephone [apparatus]

The interrogation signal, demodulated via an optical, or electronic, respectively, receiving system 1 (FIG. 1), is input into a decoding circuit 2. In the decoding circuit, at three [combinational] logic elements M1, M2 and M3, the interrogation signal is decoded simultaneously with three code texts stored in registers SR1, SR2 and SR3. The three decoded interrogation signals pass through one comparison register VR1, VR2 and VR3 each. The contents of these registers are checked (or examined) as to identify with a fixedly adjusted code word at comparison circuits V1, V2 and V3. The results of the identity check are supplied to threshold value circuits SW1, SW2 and SW3. In the threshold [value] circuits the number of correspondencies of [the] received [code word] with the fixedly adjusted code word is ascertained (or determined), and, upon exceeding a predetermined threshold (number of correspondencies), a signal is emitted (or transmitted) to a decision logic EL. The decision logic then activates switches S1 and S1' in such a fashion that only that particular code text remains effective (or operative) which was able to correctly decode the code word.

The variable data part following the code word and the respective check (or test) part of the interrogation signal is now decoded with the correct code text and can be further processed.

As previously stated, the received interrogation signal, in particular, the code word-portion, is simultaneously decoded with three different code texts. This is necessary in order that the precision demand on the control of the code apparatus S remains in realizable boundaries. A clock control of the code apparatus 5 ensures, at the location of the interrogator as well as of the transponder, the generation of the code texts; i.e., per time increment (e.g. sec), a new code text is generated. Between two new code texts, however, several interrogations can take place; therefore, in the case of every interrogation, an individual part (variable data part) is incorporated in the interrogation signal. Due to the permitted clock error—as already described above at the location of the transponder the code text valid for the interrogation must be searched out (or selected). Three code texts are here available. Relative to a clock U of the transponder and to the arrival of an interrogation, these are the code texts from a preceding, a currently valid, and a future time increment. Via the code word, information known at the transmitting- and receiving-location, the suitable code text is selected and with this code text the further processing of the interrogation signal is carried out. The transponder-code apparatus can be controlled (or operated) in the following manner:

A clock U, which consists of a quartz-controlled clock-pulse distributor chain, ensures the control (or operation) of the coder 5. Per time increment, it is now possible to generate a code text which can be modified (or influenced) via a day code.

If the value "0" is added to the clock time, the currently valid time increment (at) the coder S is effective (or operative). The past or future, respectively, time increment can be made effective through addition of $-1$ or $+1$, respectively, to the currently valid clock time.

With the recognition of an interrogation in the transponder, the coder S is activated three times with a (excessive) clock pulse speed and the value $-1.0$ and $+1$ is connected to a summer SU. The resulting code texts are stored in the separate registers SR1, SR2, SR3 and the registers SIR1, SIR2, SIR3 of a scrambler 4.

Another possibility of control (or operation) consists in that the clock U at the transponder generally advances (or gains) a time increment, and that a new code text is generated in the clock pulse of the clock per time increment. The storage of the three code texts then proceeds serially by means of series-connected registers. With the input of a new code text, the contents of the registers are automatically displaced (or shifted), so that always also the two preceded code texts are available. During the interrogation-decoding, the three registers must be (separated-up) and each individually must be closed in the circuit in order that the contents can be available to additional interrogations.

The further processing of the previously decoded variable data part proceeds in the following manner. The variable data part is read simultaneously into two installations, into an error-recognition installation 3 and into a scrambler 4. In the error-recognition installation 3, by means of a division register DR, the variable data part and the respective check (or test) part is divided by the generator polynomial. If, at the end of the division operation, a remainder remains in the register DR; i.e., if not all positions of the division register are "0", then transmission errors have been recognized. A zero test installation NT responds (or is actuated) as soon as the division register is filled with zeroes; i.e., [as soon as], with [a] high [degree of] probability, no transmission errors have occurred. In the case of a successful zero test the further processing of the variable data part is continued.

As previously stated, the variable data part is retransmitted (or forwarded) to the scrambler installation 4 and there entered into the scrambler-register SA. Simultaneously, from a code (or key)-register SIR1, SIR2, SIR3, selected via the switch S1, a code information is accepted (or transferred) into a scrambler-register SB. Both information parts, the variable data part and the code (or key) part, serve as the initial value for generating a bit-sequence in accordance with the characteristics of linear, fed-back shift registers.

Basically, the code text-portion for formation of the start address could be dispensed with here. However, it increases the simulation protection (or resistance) of the identification and renders possible long register periods.

The last bit of the variable data part represents a so-called interrogation-"number" in order that it is possible to distinguish between a first interrogation and a second interrogation. This last bit is deposited in an additional memory AN.

If the zero test in the error-recognition installation 3 was successful, then the switches S2 and S2' of the scrambler 4 are brought into position b. The register SA, SB, loaded with a start information, now operates as a linear fed-back shift register (scrambler) and generates a bit-sequence (or train) as soon as a shift clock pulse is (applied). The period of this bit sequence (or train) amounts to $2^n - 1$ bit; n is here the step number of the register.

With a first interrogation this register is now subjected to few clock pulses. The bit-sequence (or train) thus generated represents a frequency address (a-bits) and a masked information for masking of the identification. Together with a transmit command this information is retransmitted to a radiotelephony apparatus SF1. The respective frequency is adjusted there, a masked identification signal generated and the transmitter switched-on for the duration of the identification [transmission] via a sequence control 6.

A second interrogation triggers a plurality of these identification transmissions. For this purpose, the register SA, SB, is repeatedly (or multiply) charged (or loaded) with clock pulses and the transmit command is repeatedly (or multiply) issued via the sequence control. Each one of these identifications takes place on a different frequency and contains a different masked information. The identification itself is the radio-specific call signal; it is decoded from the receiving signals at the location of interrogation by means of correlation methods.

Figure 2:
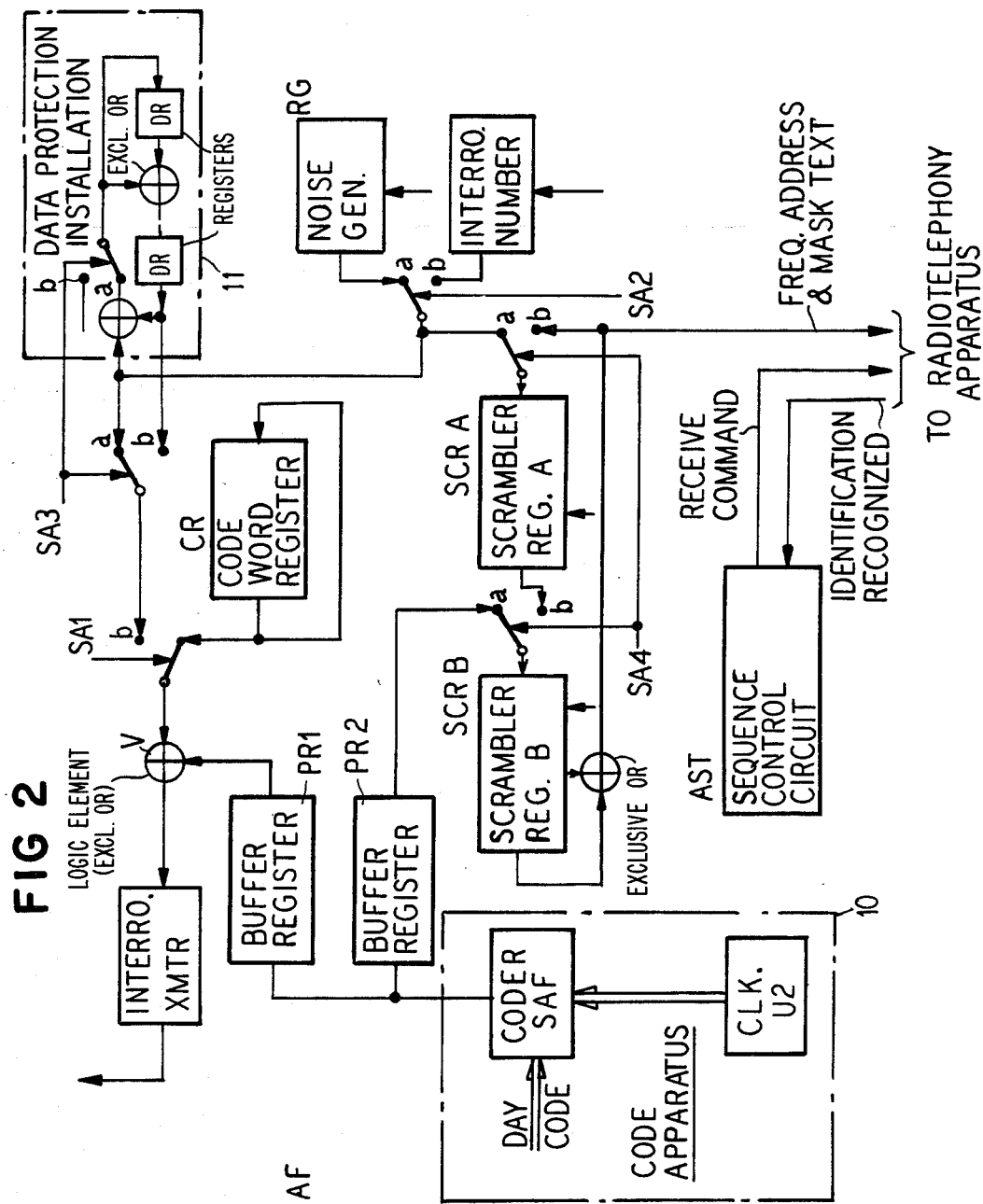

In comparison with the IFF-transponder, the interrogation-installation (FIG. 2) is substantially more simply constructed. It consists of the actual interrogator AF and the radiotelephony apparatus SF2. In particular, the code (or key) apparatus 10, together with peripheral register SR1, SR2, SR3; SIR1, SIR2, SIR3 must generate, per interrogation, only one code text and can thus be simplified. The identity check (or test) installations for the code words are eliminated. In addition, a noise [signal] generator RG is required in the interrogation installation. It generates, per interrogation, a new, variable data part which is independent of the preceding interrogation. The variable data part is converted (or revalued, or translated) in the data protection installation 11 pursuant to addition of redundancy (switch SA2 in position a; switch SA3 in position a), so that an error-recognition is possible in the transponder. The last bit of the variable data part represents the interrogation number. For this purpose, switch SA2 is brought into position. The check (or test) bits resulting in the data protection installation 11 through polynomial division are appended to the variable data part in utilizing systematic codes.

Switch SA3 is then disposed in position b. The interrogation signal, accordingly, has the following construction: code word; variable data part; check (or test) bits for error-recognition.

In detail, the following control operations are necessary:

Synchronously with the transmission of the interrogation signal, the code text is read out of the buffer register PR1 through the transmitter. On a [combinational] logic element V, the encoding of the interrogation signal takes place. The fixedly adjusted code word, stored in a code word register CR, is first transmitted (SA1 in position a). Subsequently the switch SA1 is brought into position b. The switches SA2, SA3 and SA4 are now in position a.

The variable data part generated in the noise [signal] generator RG is once loaded into the scrambler-register SCR A, on the other [hand], in the data protection installation 11, the division by the generator polynomial is carried out and simultaneously the variable data are transmitted. The last bit of the variable data part is the interrogation number; for this purpose, the switch SA2 is brought into position b. Simultaneously with the reading-in of the variable data part into the scrambler-register SCR A, the scrambler register SCR B is loaded with the code (or key) information disposed in the buffer register PR2, so that, at the end of this operation, the same start condition for the generation of the scrambler sequence is entered as at the location of the transponder.

Following transmission of the variable data part, the switch SA3 is brought into position b and the division-result—the check (or test) positions (or digits)—are read out of the data protection installation 11 and transmitted. Taking into account the signal processing time resulting at the transponder, the scrambler SCRA, SCRB is started via the switch SA4 (position b). The resulting bit-sequence (or train), together with the receive command, is forwarded (or retransmitted) to the radiotelephony apparatus SF2.

FIG. 3

In the radiotelephony apparatus SF2, the transmission frequency of the identification is adjusted and the masked text for unmasking the identification is made available (or offered). An identification correlator KK in the radiotelephony apparatus now "seeks" the identification in the receive signal. If the identification is (detected), a corresponding signal is transmitted to a sequence (or job) control AST of the interrogator AF; i.e., a "friend"-communication has arrived. A second interrogation is then not necessary.

If, by contrast, within a certain time window ($\mu$s-ms), no identification is (detected), the second interrogation is started. The scrambler SCRA, SCRB is repeatedly (or multiply) driven by clock pulses for this purpose, so that, synchronously with the transponder-radio apparatus, the respective frequencies and mask texts become effective (or operative). The second interrogation is "successful" when at least one of the identifications was recognized.

The control of the coder SAF for generating the code texts proceeds via a clock circuit. Per clock-time increment, a new code text can here be generated and deposited in the buffer memories 1 and 2. However, it is also possible to permit the clock time to act upon the coder only at the interrogation time; the code text can then be generated in step with the interrogation signal.

We claim:

1. An identification friend or foe arrangement utilizing a radio telephone installation, operable on a frequency hopping basis, for coded communication between interrogating and interrogated stations with coded interrogations and replies, comprising:
    a transmitting station including an IFF-transmitter and a radio telephone receiver comprising a frequency synthesizer;
    identification generator means connected to said IFF-transmitter including an encoder for providing thereto an interrogation including a fixed code word known to the interrogated station and a variable data portion including a frequency address and reply masking data, said receiver connected to adjust to the transmit frequency of the expected reply;
    said frequency synthesizer connected to said receiver and controlled by the frequency address;
    identification means connected to said identification generator means and to said receiver for identifying a reply of low redundancy and producing a friend signal, and including retry means operable after a predetermined interval during which a friend reply is not received to cause a second interrogation and a second reply with great redundancy at respective different frequencies and with respective different mask text;
    a transponder, including an IFF-receiver, in the interrogated station and operable in response to an interrogation to transmit a reply, including radio telephone apparatus operable to transmit to said radio telephone receiver of said transmitting station a mask text on a frequency derived from the variable data portion of the interrogation signal in response to a transmit command.

2. The arrangement of claim 1, wherein said identification generating means comprises:
    means for producing the fixed code word for a first predetermined interval; and
    means for producing the variable data for a shorter, second predetermined interval,
    the fixed and variable data serving to form the frequency addresses and masking the reply.

3. The arrangement of claim 2, and further comprising:
    an encoder in said transponder for encoding the reply; and
    clock means for operating said encoder in a quasi-synchronous manner.

4. The arrangement of claim 3, comprising:
    means operating said encoder in a start-stop operation to generate a new code text per time increment defined by such operation.

5. The arrangement of claim 4, comprising:

means in said encoder for altering the variable data from interrogation-to-interrogation.

6. The arrangement of claim 5, comprising:
decoding means in said transponder operable to simultaneously decode a plurality of code texts.

7. The arrangement of claim 5, comprising:
decoding means in said transponder operable to simultaneously decode three code texts.

8. The arrangement of claim 7, comprising:
an error detector in said transponder for detecting transmission errors.

9. The arrangement of claim 8, and further comprising:
frequency address and mask text generating means connected to said radio telephony apparatus; and
a sequence control circuit connected to said radio telephony apparatus and operable to produce the transmit command.

10. The arrangement of claim 9, wherein said frequency address and mask text generating means comprises:
a linear feedback shift register connected to said decoder to receive data derived from at least the variable data of an interrogation as its starting information.

11. The arrangement of claim 10, wherein said shift register is a clock controlled shift register.

12. The arrangement of claim 11, comprising:
clock means connected to said shift register and operable at an elevated clock rate to produce a large number of identifications on different frequencies.

13. The arrangement of claim 12, and further comprising:
sequence control means in said interrogating station operable to delay operation of said retry means to take into account the signal processing time of the transponder.

14. Transponder apparatus comprising:
a code generator for generating a plurality of codes each representing a respective time;
a receiver for receiving an interrogation code;
first and second register means connected to said code generator for storing said plurality of codes;
decoding means connected to said receiver and said first register means for decoding said interrogation code with respect to each of said plurality of codes;
third register means connected to said decoding means for storing the decoded codes;
comparison means connected to said third register means for comparing such decoded codes with fixedly adjusted code words;
threshold value means connected to said comparison means for determining the maximum number of correspondencies between the received decoded codes and the fixedly adjusted codes;
first switch means connected to said third register means;
second switch means connected to said second register means;
logic means connected to said comparison means and to said first and second switch means and operable in response to the determined maximum correspondencies to operate said first and second switch means for outputting the corresponding code word from said second and third register means;
fourth and fifth register means connected to receive the codes from said second and third register means, respectively;
test means connected to said second switch means for receiving the contents of said third register means, testing for transmission errors and producing a start signal;
control means operable in response to a start signal to cause said fourth and fifth register means to operate as a feedback shift register and produce a pulse train comprising frequency address and mask text data, and to provide a transmit command; and
radio transmission means connected to said shift register to receive the pulse train and to said control means to receive said transmit command, and responsive to said transmit command to transmit said pulse train at the determined frequency.

15. The transponder apparatus of claim 14, and further comprising:
means connected to said third register means and to said sequence control and responsive to said third register means receiving a code from a second interrogation to cause said control means to operate said shift register and said radio transmission means a plurality of times at a plurality of frequencies.

16. A method for the transmission of identification friend or foe information in radio telephone technique and using the frequency hopping principle, comprising the steps of:
generating interrogations at a ground station including a fixed code word as a frequency address of an expected reply and variable data as a reply mask;
transmitting the interrogation to an interrogation station which includes a transponder;
separating the code word and the mask at the interrogated station;
transmitting a reply from the interrogated station by radio telephone to the interrogating station;
unmasking the reply at the interrogating station; and
identifying the friend code.

* * * * *